(12) United States Patent
Koppelaar et al.

(10) Patent No.: US 9,916,708 B2
(45) Date of Patent: Mar. 13, 2018

(54) SIGNAL PROCESSING SYSTEM AND METHOD

(71) Applicant: NXP B.V.

(72) Inventors: Arie Koppelaar, Glessen (NL); Frank Leong, Veldhoven (NL); Stefan Drude, Waalre (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 15/605,721

(22) Filed: May 25, 2017

(65) Prior Publication Data

US 2017/0358158 A1 Dec. 14, 2017

(30) Foreign Application Priority Data

Jun. 8, 2016 (EP) ..................................... 16173467

(51) Int. Cl.
*G07C 9/00* (2006.01)
*B60R 25/24* (2013.01)

(52) U.S. Cl.
CPC .......... *G07C 9/00182* (2013.01); *B60R 25/24* (2013.01); *G07C 2009/00198* (2013.01); *G07C 2009/00293* (2013.01)

(58) Field of Classification Search
CPC ...... G07C 9/00182; G07C 2009/00198; G07C 2009/00293; B60R 25/24
See application file for complete search history.

(56) References Cited

U.S. PATENT DOCUMENTS

| 7,162,243 B2 * | 1/2007 | Baker .................. H04B 1/7115 455/436 |
| 9,613,475 B2 | 4/2017 | Zivkovic et al. |
| 2002/0006158 A1 * | 1/2002 | Schmidl .............. H04B 1/7075 375/150 |
| 2002/0181559 A1 * | 12/2002 | Heidari-Bateni ...... H04B 1/711 375/148 |
| 2003/0142730 A1 * | 7/2003 | Lin ...................... H04B 1/7097 375/147 |

(Continued)

FOREIGN PATENT DOCUMENTS

| EP | 1 746 739 A2 | 1/2007 |
| EP | 1 845 628 A1 | 10/2007 |

OTHER PUBLICATIONS

Poturalski, M. et al. "On Secure and Precise IR-UWB Ranging", IEEE Transactions on Wireless Communications, vol. 11, No. 3, pp. 1087-1099 (Mar. 2012).

(Continued)

*Primary Examiner* — Thomas Alunkal
(74) *Attorney, Agent, or Firm* — Rajeev Madnawat

(57) ABSTRACT

According to a first aspect of the present disclosure, a signal processing system is provided, comprising: a receiving unit configured to receive at least one signal that comprises a plurality of multipath components; a verification unit configured to correlate at least one multipath component under test with a reference signal derived from one or more of said plurality of multipath components. According to a second aspect of the present disclosure, a corresponding signal processing method is conceived. According to a third aspect of the present disclosure, a corresponding computer program is provided.

15 Claims, 5 Drawing Sheets

(56) References Cited

U.S. PATENT DOCUMENTS

| | | | | |
|---|---|---|---|---|
| 2005/0078741 | A1* | 4/2005 | Song | H04B 1/71 375/148 |
| 2006/0120438 | A1* | 6/2006 | Reial | H04B 1/7115 375/148 |
| 2007/0177657 | A1* | 8/2007 | Espax | H04B 1/7113 375/148 |
| 2014/0198886 | A1* | 7/2014 | Yang | H04B 1/7115 375/350 |
| 2014/0330449 | A1* | 11/2014 | Oman | G01S 13/765 701/2 |
| 2015/0015193 | A1* | 1/2015 | Oman | B60L 11/1829 320/108 |
| 2015/0234034 | A1* | 8/2015 | Ben-Haim | G01S 5/10 455/456.1 |
| 2016/0003931 | A1* | 1/2016 | Ledingham | G01S 3/38 342/443 |

OTHER PUBLICATIONS

John G. Proakis, Digital Communications, 3rd edition, McGraw-Hill, pp. 776-807 (1995).

Ahmadian, Z. et al. "Performance Analysis of the IEEE802.15.4a UWB System", IEEE transactions on Communications, vol. 57, No. 5, pp. 1474-1485 (May 2009).

Francillon, A. et al. Relay Attacks on Passive Keyless Entry and Start Systems in Modern Cars. The 2011 Network and Distributed System Security Symposium (NDSS), San Diego, California, 15 pgs. (Feb. 2011).

* cited by examiner

SIGNAL PROCESSING SYSTEM AND METHOD

CROSS-REFERENCE TO RELATED APPLICATIONS

This application claims the priority under 35 U.S.C. § 119 of European Patent application no. 16173467.8, filed on Jun. 8, 2016, the contents of which are incorporated by reference herein.

FIELD

The present disclosure relates to a signal processing system. Furthermore, the present disclosure relates to a corresponding signal processing method and to a corresponding computer program.

BACKGROUND

A Passive Keyless Entry (PKE) system is a system that provides a user access to a protected area (e.g., a protected object such as a house, office building or car) without the need of actively using a key or key fob. The only requirement is that the user has the key fob with him or her and that he or she is in the proximity of the protected area. It may be desirable to improve the security of existing PKE systems.

SUMMARY

According to a first aspect of the present disclosure, a signal processing system is provided, comprising: a receiving unit configured to receive at least one signal that comprises a plurality of multipath components; a verification unit configured to correlate at least one multipath component under test with a reference signal derived from one or more of said plurality of multipath components.

In one or more embodiments, said multipath component under test is received earlier in time than the multipath component or components from which the reference signal is derived.

In one or more embodiments, the reference signal is derived from the strongest multipath component or components.

In one or more embodiments, the receiving unit comprises a rake receiver having a finger that is assigned to the multipath component under test, and an output of said finger is coupled to an input of the verification unit.

In one or more embodiments, the verification unit is configured to derive the reference signal by generating a demodulated signal using one or more of said plurality of multipath components, decoding the demodulated signal, re-encoding the result of said decoding, and modulating the result of said re-encoding.

In one or more embodiments, the verification unit is further configured to decode and re-encode only a part of the demodulated signal.

In one or more embodiments, the verification unit is further configured to buffer the multipath component under test before correlating it with the reference signal.

In one or more embodiments, the verification unit is further configured to select a subset of symbols from the multipath component under test and to select a corresponding a subset of symbols from the reference signal, and to correlate only said subsets with each other.

In one or more embodiments, the verification unit is further configured to verify if the result of the correlation increases linearly.

In one or more embodiments, the verification unit is further configured to correlate a combination of multipath components under test with said reference signal.

In one or more embodiments, the verification unit is further configured to receive the reference signal through a side-channel.

In one or more embodiments, the verification unit is further configured to select, in a plurality of multipath-component clusters, the earliest multipath component of each cluster, and to verify each cluster by correlating its earliest multipath component with the reference signal.

In one or more embodiments, a protected object comprises a system of the kind set forth, said object being or comprising a vehicle, an office building, a factory plant, energy plant, or a payment terminal.

According to a second aspect of the present disclosure, a signal processing method is conceived, comprising: by a receiving unit, receiving at least one signal that comprises a plurality of multipath components; by a verification unit, correlating at least one multipath component under test with a reference signal derived from one or more of said plurality of multipath components.

According to a third aspect of the present disclosure, a computer program is provided, comprising non-transient instructions which, when executed, carry out or control a method of the kind set forth.

DESCRIPTION OF DRAWINGS

Embodiments will be described in more detail with reference to the appended drawings, in which.

DESCRIPTION OF EMBODIMENTS

Figure 1:
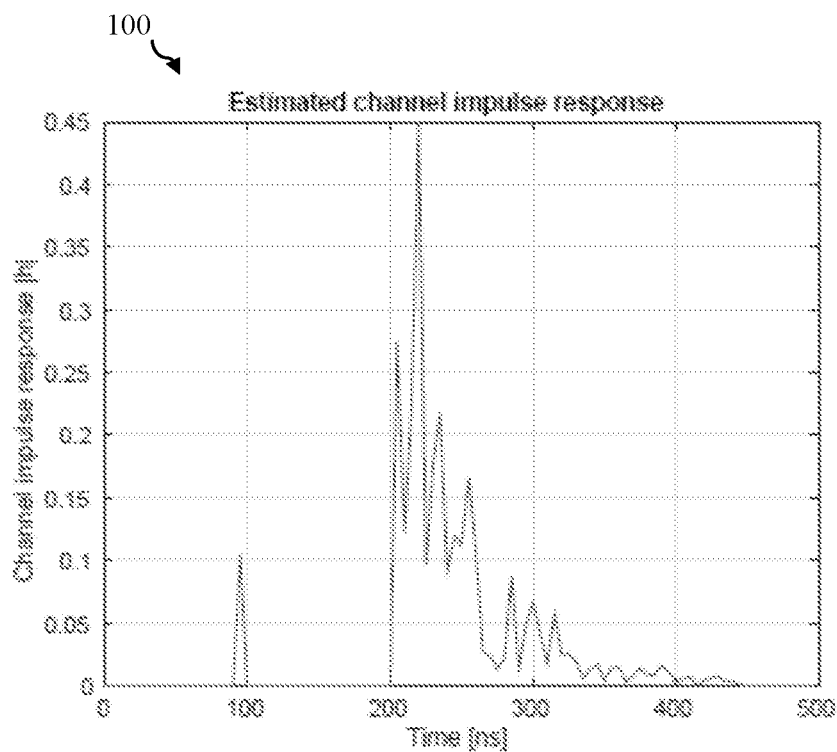
FIG. 1 shows an example of an estimated channel impulse response.

A Passive Keyless Entry (PKE) system is a system that provides a user access to a protected area (e.g., a protected object such as a house, office building or car) without the need of actively using a key or key fob. The only requirement is that the user has the key fob with him or her and that he or she is in the proximity of the protected area. The requirement to be in the proximity of the protected area may be regarded as a location verification problem between a verifier (i.e., the protected area performing a verification process) and a prover (i.e., an authentication token, such as a key fob, providing credentials to the verifier). In accordance with the present disclosure, the location verification is confined to a distance verification problem. The objective of verifying the distance between the verifier and the prover is to rule out attacks in which the challenge and responses are relayed by malicious persons over a large distance between the verifier and the prover. The passive keyless feature of the system implies that such a relay attack may take place without notification of the key fob owner. The proximity check can be carried out with a short range detection mechanism. When a user is in the proximity of the protected area, a detector in the protected area detects the presence of a key fob and can initiate communication with the key fob such that credentials of the key fob can be authenticated by the verifier. However, this approach is vulnerable to so-called relay attacks. Relay attacks have been described, for instance, in the article "Relay Attacks on Passive Keyless Entry and Start Systems in Modern Cars" by A. Francillon, B. Danev and S. Capkun, published at the 2011 Network and Distributed System Security Symposium (NDSS), San Diego, Calif., 6-9 Feb. 2011.

A relay attack may be performed as follows. A malicious person can trigger the short-range detection mechanism and relay the initiation of the communication protocol between the protected area and the key fob with, for example, a cable. The initiation of the communication protocol via the relay causes a response of the key fob. The response of the key fob may be relayed by the attacker to the protected area as well, but perhaps the used communication between the key fob and the protected area has a bigger range than what is accepted for the proximity requirement. Since the PKE system is designed on purpose to require no active involvement of the owner of the key fob, the owner will be unaware of the relay attack. Moreover, challenges and responses are relayed between the protected area and the key fob by the attacker without inspection of the messages. Therefore, the attacker does not have to generate the response; he only has to forward the challenges and the response.

A way to protect systems against relay attacks is to add means for determining the distance between the protected area and the key fob. When the distance is larger than what is accepted by the proximity requirement, access to the protected area is denied. In particular, a distance measurement based on the time-of-flight (TOF) of electromagnetic waves can be used to determine the distance between the protected area and the key fob. An attacker that relays the challenges and responses over a distance that is too large will fail in his attempt to get access to the protected area because the TOF will indicate that the distance is too large. Malicious persons that are willing to do more than just relaying the signals can try to simulate time advancement of the messages, but with random and computationally difficult challenges they cannot successfully simulate a shorter TOF.

Messages are normally broken down into packets in order to facilitate their transmission. A packet, in turn, contains at least a preamble field, a header field and one or more frames that contain the so-called payload of the packet (i.e., the actual data that are transmitted). A TOF measurement can be done by time stamping the reception of a particular part of a packet. In some communication standards a ranging field may be present in a packet in order to determine the TOF. When such a ranging field contains deterministic values, an attacker can make use of this property and inject a signal in the air that is advanced in time compared to the authentic communication between the protected area and the key fob, such that the TOF determination will lead to a smaller value and the corresponding range calculation will conclude with a smaller distance determination. A way to mitigate this security flaw is to use ranging fields with a random but earlier agreed ranging marker. However, this approach requires extra means to come to an agreement on the ranging marker value. For instance, the random marker field can be agreed upon using additional messages; alternatively, ranging markers can be generated synchronously by a transmitter and a receiver. In the IEEE802.15.4a standard the packet format has no ranging field and it is suggested to use for example the boundary between the Start-Of-Frame Delimiter (SOFD) and the header field. However, the contents of the SOFD field are fixed and can therefore easily be inserted in the message exchange by an attacker in order to realize a shorter TOF. Moreover, a known preamble is prepended to the SOFD; as a result, an attacker can already start to advance the TOF measurement during the acquisition phase.

A TOF measurement is often done by correlating a received signal with a sequence that is present in the transmitted signal and that one wants to use for determining the time-of-arrival of the message. This sequence might be the sequence in the ranging field or the SOFD sequence. Correlation refers to a process of computing a correlation coefficient that shows the degree of similarity between the received signal and said sequence. In case of multipath communication, several correlation hits will occur, but for the TOF determination the earliest multipath component is relevant, which normally is the Line-of-Sight (LOS) component. Such a LOS component might be weaker than multipath components that are later in the channel impulse response. For instance, the radio path between the protected area and the key fob might be obstructed by the body of a person (e.g. the user) such that the propagation of the direct path is attenuated and might be weaker than a radio wave that travelled a longer path.

It is noted that the TOF determination is closely related to the estimation of the channel impulse response. For the TOF determination one is interested in the earliest arrival of signal energy while for the channel impulse response estimation one is interested in all multipath components that can contribute to successful decoding of the whole message. For example, in a rake receiver, the contributions of the strongest multipath components can be coherently combined such that the signal-to-noise ratio (SNR) at the symbol decision device is maximized. With a predictable preamble and ranging marker (or SOFD), the time arrival of the earliest multipath component can easily be manipulated by an attacker by transmission of a time advanced version of the preamble and ranging marker. However, an attacker cannot do this for the rest of the packet in case of an unpredictable payload (e.g., challenge and/or response).

FIG. 1 shows an example of an estimated channel response. The first multipath component of the received signal arrives at around 100 ns such that a distance of around 30 meters between transmitter and receiver can be assumed. More reflections are seen after 200 ns, meaning that these radio paths travel 60 meters or more. However, as discussed before, with predictable signals an earlier multipath component can easily be simulated by an attacker. The simulation of the earlier multipath component becomes more difficult during the payload phase, because data is not or less predictable in that phase. The question arises whether the earliest multipath component is a genuine radio wave or a simulated one. The presently disclosed system and method facilitate verifying the content that is modulated on a multipath component.

The following cases can be distinguished:

A system can base its access decision only on the TOF determination that is done based on the preamble and the ranging field. The system will not verify whether the earliest multipath component is still present during the rest of the packet. In this case, the attacker does not have to simulate the earliest multipath component during the rest of the packet.

When in the system the presence of the earliest multipath component is checked during the payload part of the packet the attacker has to follow another strategy. In particular, he has to simulate the earliest multipath component also during the payload phase, but he has the problem that he does not know which information to modulate during the payload phase. A strategy that can be followed by the attacker is to give the earliest multipath component an amplitude that is just high enough to be detected during the TOF measurement in preamble and SOFD, but that is not high enough to allow demodulation during the payload phase or to negatively influence the multipath combiner output during the payload. Since the attacker cannot fully predict the payload, he has to modulate the simulated multipath component with random data. In this way the system will sense the presence of signal energy at the arrival time of the presumed earliest multipath component but it cannot check whether the content of the earliest multipath component is authentic or random. For accepting a TOF determination the system can follow two procedures:

1) It can accept a TOF determination only when it is able to demodulate the earliest multipath component and check its consistency with the content of the other multipath components. The disadvantage of this method is that the earliest multipath component should be sufficiently strong; otherwise the ranging measurement will be discarded. This leads to an asymmetry in communication robustness versus ranging robustness. Since for communication one wants to use the contribution of the strongest multipath components, communication is more robust than ranging which is based upon the contribution of the earliest multipath component. Moreover, a separate demodulation of the earliest multipath component requires duplication of modulation and decoding resources.

2) The system may only check the presence of the earliest multipath component, but in that case the attacker has an easy game. The attacker has to simulate the presence of the earliest multipath component, but he does not have to care about the information to modulate on this multipath component.

The presently disclosed system and method facilitate checking the consistency of the earliest multipath component without demodulating this component. As discussed above, checking the consistency of the content of the earliest multipath component by demodulating the content separately from the other multipath components might be difficult and expensive. The earliest multipath component might be very weak and for communication robustness it is preferred to combine the information of the strongest multipath components. Therefore, in accordance with the present disclosure, a signal processing system is provided, comprising: a receiving unit configured to receive at least one signal that comprises a plurality of multipath components; a verification unit configured to correlate at least one multipath component under test with a reference signal derived from one or more of said plurality of multipath components. Furthermore, a corresponding signal processing method is conceived. Using the presently disclosed system and method, the following practical and efficient consistency check may for example be realized: a reference signal may be derived from the strongest multipath components of a signal, and the reference signal may be used for verifying the consistency of information present in the earliest multipath component. This, in turn, enables checking the consistency of the earliest multipath component without demodulating this component.

Thus, in one or more embodiments, the multipath component under test is received earlier in time than the multipath component or components from which the reference signal is derived. Furthermore, in one or more embodiments, the reference signal is derived from the strongest multipath component or components. However, the multipath component under test may also be another multipath component; for instance, it is not necessarily the earliest one. For example, one can run a verification on several multipath components, and the earliest (time-of-arrival) one for which the verification test succeeds will be used for a range determination.

Figure 2:
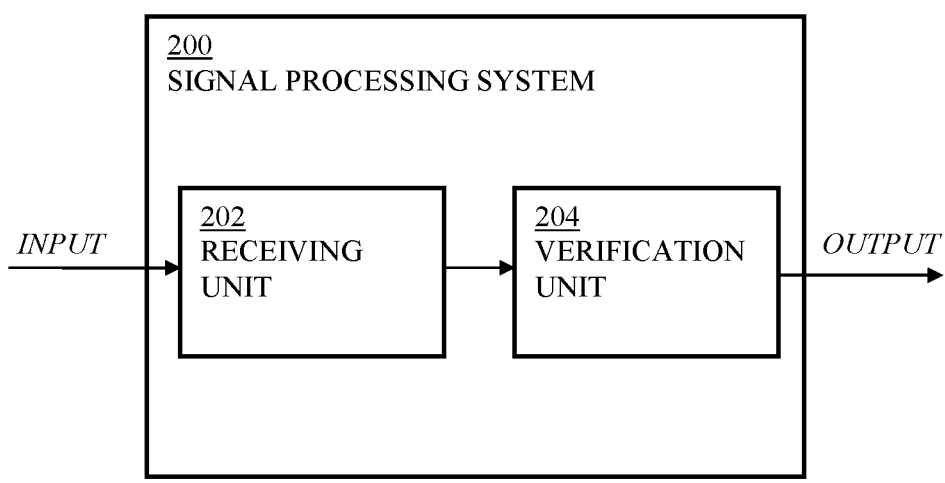
FIG. 2 shows an illustrative embodiment of a signal processing system.

FIG. 2 shows an illustrative embodiment of a signal processing system 200. The system 200 comprises a receiving unit 202 operatively coupled to a verification unit 204. The receiving unit 202 has an input for receiving an input signal. The verification unit 204 has an output for outputting, among others, the result of a verification of the consistency of information present in one or more multipath components under test.

Figure 3:
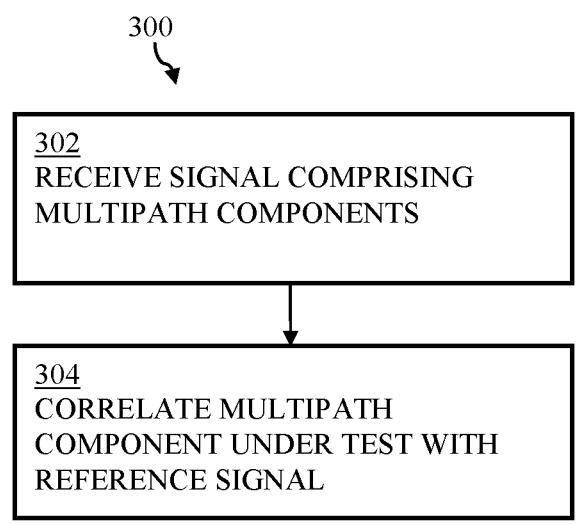
FIG. 3 shows an illustrative embodiment of a signal processing method.

FIG. 3 shows an illustrative embodiment of a signal processing method 300. The method comprises, at 302, receiving, by the receiving unit 202, at least one signal that comprises a plurality of multipath components. Furthermore, the method 300 comprises, at 304, correlating, by the verification unit 204, at least one multipath component under test with a reference signal derived from one or more of said plurality of multipath components.

Figure 4:
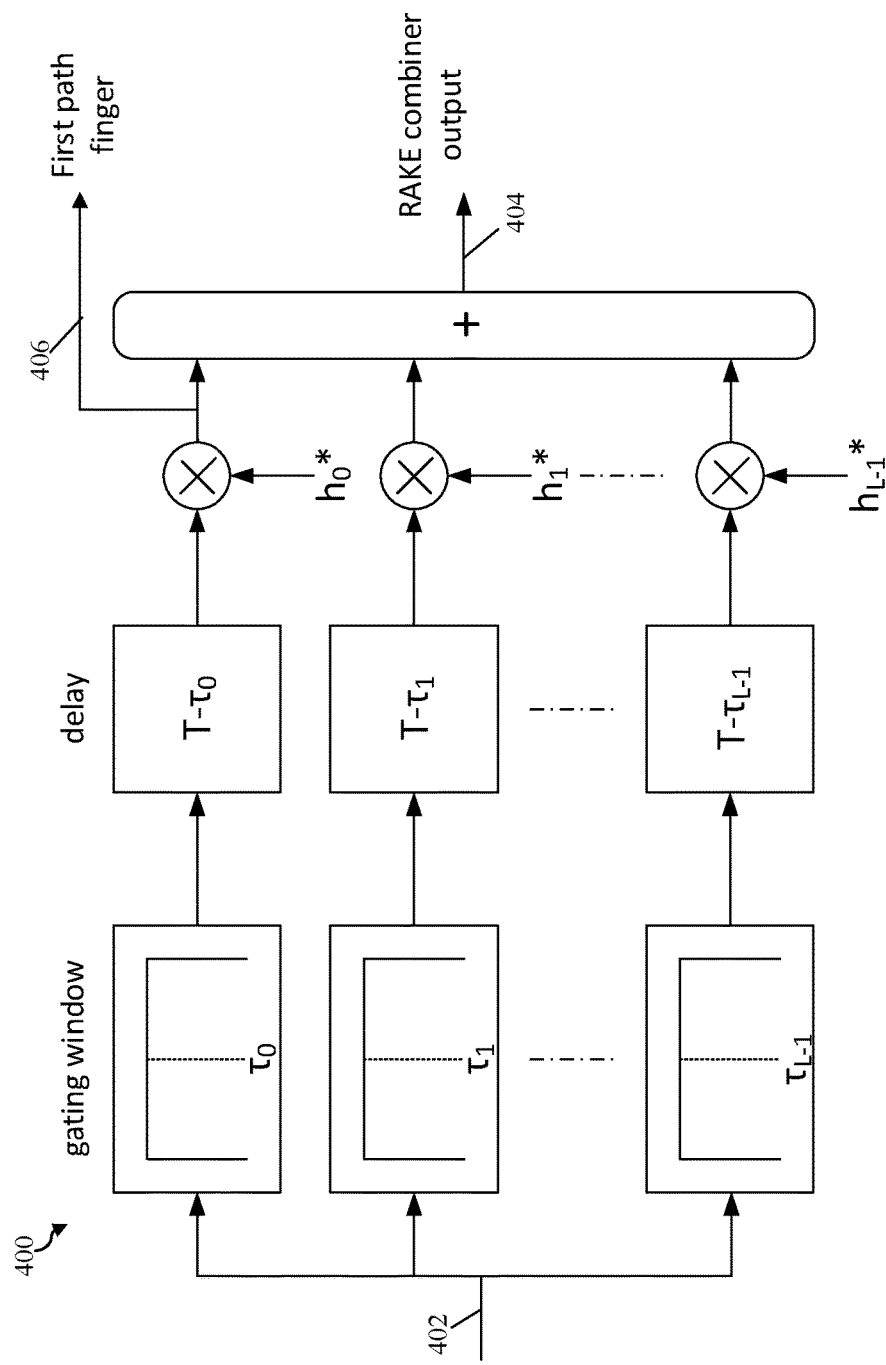
FIG. 4 shows an illustrative embodiment of a receiving unit.

FIG. 4 shows an illustrative embodiment of a rake receiver 400. In this non-limiting example, the receiving unit comprises a rake receiver 400. It is noted that the presently disclosed system and method may also employ other types of receivers capable of handling multipath components, such as channel matched filters. The rake receiver 400 has an input 402, a combiner output 404 and a first path rake finger output 406. In a practical and efficient implementation, the rake receiver 400 has a finger that is assigned to the multipath component under test. In this example, the first path rake finger 406 corresponds to said finger. The output of rake finger 406 is coupled to an input of the verification unit (not shown). In particular, a rake receiver is shown, which has, in addition to a conventional rake combiner output, a finger assigned to the multipath component under test. In this example, the multipath component under test is the earliest multipath component (first path). The output of this finger is forwarded separately to the verification unit, in which a consistency check on the content is carried out. In case there are two or more multipath components under test, then a separate finger may be assigned to each multipath component under test. In that case, the outputs of these fingers may also be forwarded to the verification unit. It is noted that, in addition to the rake receiver 400, the receiving unit may contain other blocks (not shown) that may support the rake receiver 400, such as a carrier/clock synchronization block and a channel estimation block.

Figure 5:
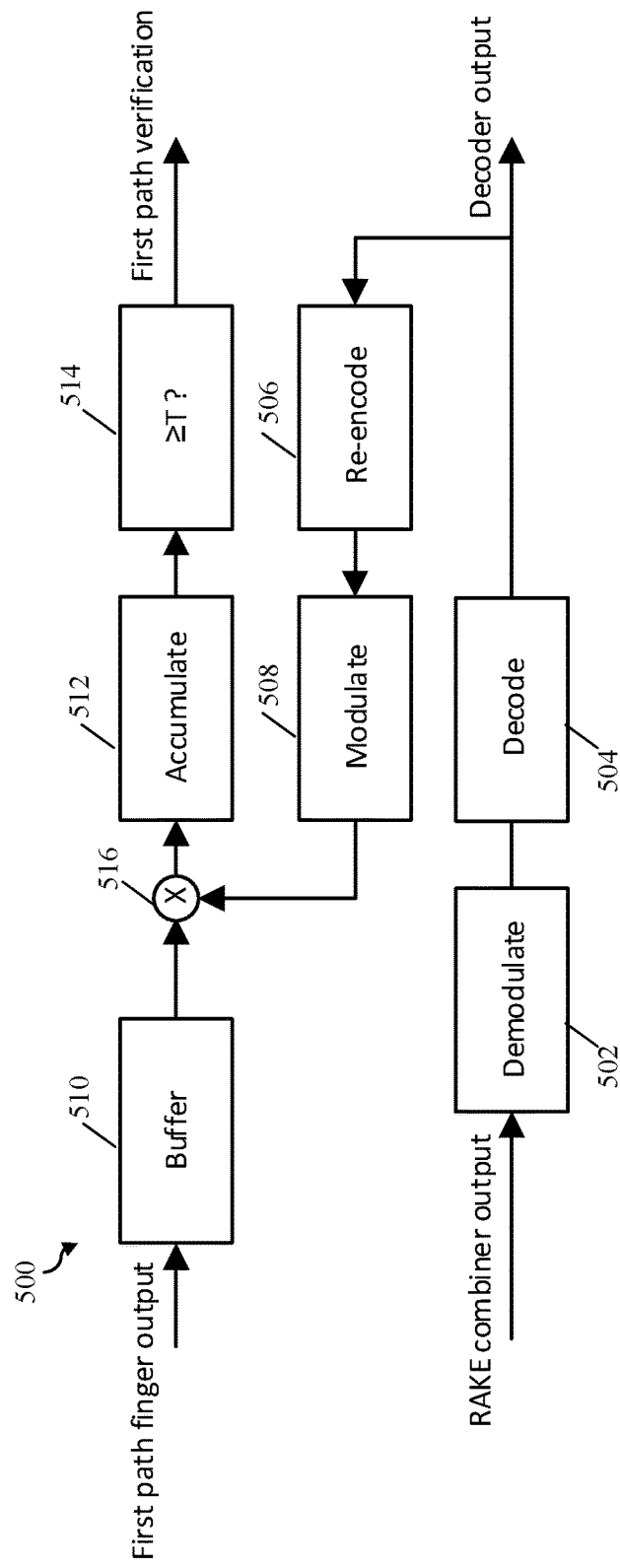
FIG. 5 shows an illustrative embodiment of a verification unit.

FIG. 5 shows an illustrative embodiment of a verification unit 500. The verification unit 500 comprises a demodulator 502 operatively coupled to a decoder 504, a re-encoder 506 operatively coupled to the decoder 504, and a modulator 508 operatively coupled to the re-encoder 506. Furthermore, the verification unit 500 comprises a buffer 510, a multiplier 516, an accumulator 512, and a comparator 514 for determining whether the output of the accumulator 512 is greater than or equal to a threshold "T". The combination of the multiplier 516 and accumulator 512 (i.e., integrator) may be referred to as a correlator. In operation, the buffer 510 takes the output of the first path finger (not shown) as an input.

Furthermore, the demodulator 502 takes the combiner output of the receiving unit (not shown) as an input. Furthermore, the comparator 514 outputs a verification result indicative of the result of the correlation process. In particular, the verification result indicates whether the multipath component under test (embodied by, in this example, the output of the first path finger) is sufficiently similar to the reference signal (embodied by, in this example, the output of the modulator 508). It is noted that the correlator may comprise a complex multiplier in which a received baseband signal of the multipath component under test is multiplied with a complex conjugate of a reference baseband signal.

Thus, in one or more embodiments, the verification unit is configured to derive the reference signal by generating a demodulated signal using one or more of said plurality of multipath components, decoding the demodulated signal, re-encoding the result of said decoding, and modulating the result of said re-encoding. This results in a practical and efficient implementation. More specifically, the verification unit may forward the demodulated and decoded combiner output of the receiving unit and at the same time verify the consistency of the earliest multipath component without demodulating this component. Furthermore, in one or more embodiments, the verification unit is further configured to buffer the multipath component under test before correlating it with the reference signal. Buffering the multipath component under test may compensate for the latency introduced by the demodulator, decoder, re-encoder and modulator. Thus, said buffering enables alignment in time of the multipath component under test and the reference signal.

FIG. 5 shows that the verification unit 500 contains the demodulator 502 and the decoder 504. However, in other embodiments, the demodulator 502 and the decoder 504 may form part of the receiving unit. It is noted that the receiving unit normally already contains a demodulator and a decoder. Thus, in a practical and efficient implementation, the re-encoder 506 of the verification unit may simply process the output of the receiving unit's decoder. Furthermore, in other embodiments, the verification unit may receive the reference signal through a side-channel; in that case, the path consisting of blocks 502, 504, 506, 508, as well as block 510 may not be necessary, and consequently the verification unit may only comprise blocks 512, 514, 516, for example.

Thus, in this non-limiting example, the proposed consistency check is a correlation of the information on the earliest multipath component with the re-encoded modulated signal. The modulated and decoded output serves after re-encoding and modulation as a reference signal to the signal of the first path finger. A buffer for storing the first path finger output may be used for compensating the demodulator, decoder, re-encoder and modulator latency. Alternatively, the reference signal may be received through a side channel (not shown) and fed directly to the correlator, more specifically to the multiplier 516. In this way, the re-encoder 506, modulator 508 and buffer 510 may be dispensed with. The side-channel may be an encrypted channel. When the information on the earliest multipath component is authentic, the correlation value will increase fairly linearly. In case an attacker is simulating the earliest multipath component with random data, the correlation result will not increase linearly, but it will randomly move around zero. In this implementation, which represents a non-limiting example, the threshold T for successful verification should be monotonically dependent on the strength of the tested multipath component.

Furthermore, in one or more embodiments, the verification unit is further configured to decode and re-encode only a part of the demodulated signal. Thereby, a trade-off may be achieved between the size of the buffer and the performance of the verification process. A trade-off between the buffer size and the verification performance can be achieved by skipping parts of the decoder and re-encoder. For instance, according to the standard IEEE802.15.4a a concatenation of a convolutional code and a Reed-Solomon (RS) code is used. One can for example only re-encode and modulate the output of the Viterbi decoder (i.e., only the decoded convolutional code), so that the latency of the RS decoder and encoder in the verification path may be avoided. In particular, this leads to a lower latency in the re-encoding path and therefore a smaller buffer is needed for the first path finger output.

Figure 6:
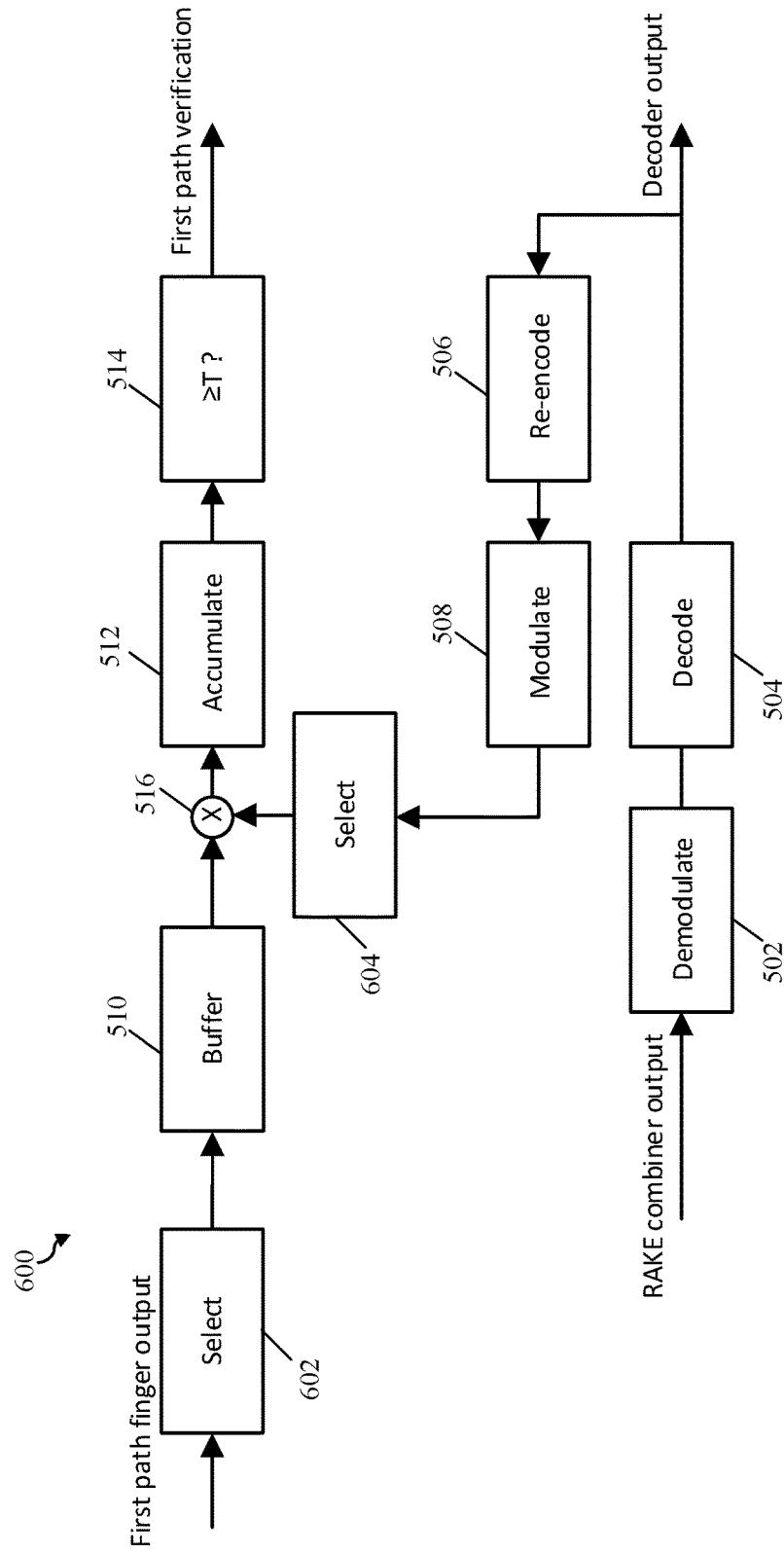
FIG. 6 shows another illustrative embodiment of a verification unit.

FIG. 6 shows another illustrative embodiment of a verification unit 600. In addition to the components shown in FIG. 5, the verification unit 600 comprises a first selector 602 operatively coupled to the buffer 510, and a second selector 604 operatively coupled to the modulator 508. In operation, the first selector 602 takes the output of the first path finger (not shown) as an input, selects a portion of said output, and provides the selected portion to the buffer 510. Furthermore, the second selector 604 takes the output of the modulator 508 as an input, selects a portion of said output, and provides the selected portion as input to the correlation process. Alternatively, the second selector 604 may be placed between the decoder 504 and the re-encoder 506. In that case, the second selector 604 takes the output of the decoder 504 as an input, selects a portion of said output, and provides the selected portion as input to the re-encoder 506. It is noted that the term "portion" refers to a subset of symbols of the multipath component under test and the reference signal, respectively.

Thus, in one or more embodiments, the verification unit is further configured to select a portion of the multipath component under test (embodied by, in this example, a portion of the output of the first path finger) and to select a corresponding portion of the reference signal (embodied by, in this example, a portion of the output of the modulator 508), and to correlate only said portions with each other. Thereby, a further reduction of the buffer size may be achieved, and at the same time a more reliable verification process may be realized. In general, the longer the payload, the more spreading gain will be obtained and the more robust the earliest path verification can be made. Since some parts of the payload can be predictable, these parts can be excluded from the correlation in order to anticipate manipulation by an attacker. The attacker can for example boost the predictable part such that the accumulator value will grow faster. In accordance with the present disclosure, however, the predictable part of the payload may be excluded from the verification process. That is to say, by verifying only a part of the signal on the first path finger output, a reduction of buffer size may be accomplished, and if predictable information can be excluded from the verification process, the verification may become more reliable.

Furthermore, in one or more embodiments, the verification unit is further configured to verify if the result of the correlation increases linearly. Thereby, the security of a PKE system may be further increased in the following sense: one can also put constraints on the way the correlation result evolves as a function of time, such that an attacker cannot influence the correlation result by few lucky guesses (i.e., the correlation results should increase linearly).

It is noted that the presently disclosed system and method may be applied not only to the earliest multipath component of a signal, but also to other multipath components or to a group of multipath components. For example, one can perform a verification on several multipath components, and the earliest (time-of-arrival) one for which the verification test succeeds may be used for a range determination. In another possible implementation the first path can be combined with one or more second paths such that the probability of success in case of two genuine paths will increase. In other words, in one or more embodiments, the verification unit is further configured to correlate a combination of multipath components under test with the reference signal. According to these embodiments, one can, in a similar way as is done for the main signal (i.e., combining the multipath components in a rake receiver, as shown in FIG. 4), also make a combined signal for two or more multipath components under test. After combining the two or more multipath components under test in a smaller rake configuration, the verification for whether the signal contains the expected information is not done on the individual multipath components under test but on their combined result. In case the combined multipath components under test are all genuine, the verification value (correlator value) will be higher and the probability that a time-of-arrival measurement will be discarded due to a non-conclusive verification value will be smaller. In case not all multipath components are genuine, the verification value will accordingly be smaller than expected. It is noted that, if these embodiments are used, the probability of a successful attack might also increase. Nevertheless, by selecting a second path of similar strength and by accordingly increasing the threshold for acceptance a trade-off between false acceptance and wrong rejections can be achieved.

Furthermore, in one or more embodiments, the verification unit is further configured to select, in a plurality of multipath-component clusters, the earliest multipath component of each cluster, and to verify each cluster by correlating its earliest multipath component with the reference signal. In particular, a channel estimation typically yields clusters of multipath components. In accordance with these embodiments, the verification (i.e., correlation) may be performed only on the earliest (i.e., first) multipath component of the first cluster. Then, if the verification result indicates this multipath component is not a genuine one (e.g., if the correlation value does not increase linearly as expected), then the whole cluster to which said component belongs may be regarded as not genuine. In other words, all other multipath components of the same cluster are regarded as not genuine. Subsequently, the earliest (i.e., first) multipath component of the next cluster may be verified. Again, if the verification result indicates this multipath component is not a genuine one, then the whole cluster to which said component belongs may be regarded as not genuine. This process may be repeated until a multipath component yields a positive verification result; this multipath component may then be used for a range determination. These embodiments may result in a more efficient use of resources, because only one correlation needs to be performed for a whole cluster of multipath components. That is to say, each cluster may still be tested, but the implementation complexity may be reduced. It is noted that, although this process has been described as a sequential process, it is also possible that the earliest multipath components of said clusters are tested in parallel.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet, etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 estimated channel impulse response
200 signal processing system
202 receiving unit
204 verification unit
300 signal processing method
302 receive signal comprising multipath components
304 correlate multipath component under test with reference signal
400 rake receiver
402 input of rake receiver
404 output of rake receiver
406 first path finger
500 verification unit
502 demodulate
504 decode
506 re-encode
508 modulate
510 buffer
512 accumulate
514 compare
516 multiply
600 verification unit
602 select
604 select

The invention claimed is:

1. A signal processing system comprising:
a receiving unit configured to receive at least one signal that comprises a plurality of multipath components, the at least one signal includes request to access a protected area;
a verification unit configured to correlate at least one multipath component under test with a reference signal derived from one or more of said plurality of multipath components, wherein a distance between a source of the at least one multipath component and the protected area is measured using a time-of-flight method and if the measured distance is greater than a predefined distance threshold, the request to access the protected area is denied.

2. A system as claimed in claim 1, wherein said multipath component under test is received earlier in time than the multipath component or components from which the reference signal is derived.

3. A system as claimed in claim 1, wherein the reference signal is derived from the strongest multipath component or components.

4. A system as claimed in claim 1, wherein the receiving unit comprises a rake receiver, wherein said rake receiver has a finger that is assigned to the multipath component under test, and wherein an output of said finger is coupled to an input of the verification unit.

5. A system as claimed in claim 1, wherein the verification unit is configured to derive the reference signal by generating a demodulated signal using one or more of said plurality of multipath components, decoding the demodulated signal, re-encoding the result of said decoding, and modulating the result of said re-encoding.

6. A system as claimed in claim 5, wherein the verification unit is further configured to decode and re-encode only a part of the demodulated signal.

7. A system as claimed in claim 1, wherein the verification unit is further configured to buffer the multipath component or components under test before correlating it with the reference signal.

8. A system as claimed in claim 1, wherein the verification unit is further configured to select a subset of symbols from the multipath component under test and to select a corresponding subset of symbols from the reference signal, and to correlate only said subsets with each other.

9. A system as claimed in claim 1, wherein the verification unit is further configured to verify if the result of the correlation increases linearly.

10. A system as claimed in claim 1, wherein the verification unit is further configured to correlate a combination of multipath components under test with said reference signal.

11. A system as claimed in claim 1, wherein the verification unit is further configured to receive the reference signal through a side-channel.

12. A system as claimed in claim 1, wherein the verification unit is further configured to select, in a plurality of multipath-component clusters, the earliest multipath component of each cluster, and to verify each cluster by correlating its earliest multipath component with the reference signal.

13. A protected object comprising a system as claimed in claim 1, said object being or comprising a vehicle, an office building, a factory plant, energy plant, or a payment terminal.

14. A signal processing method comprising:
by a receiving unit, receiving at least one signal that comprises a plurality of multipath components, the at least one signal includes request to access a protected area;
by a verification unit, correlating at least one multipath component under test with a reference signal derived from one or more of said plurality of multipath components, wherein a distance between a source of the at least one multipath component and the protected area is measured using a time-of-flight method and if the measured distance is greater than a predefined distance threshold, the request to access the protected area is denied.

15. A non-transitory computer readable media comprising programming instructions which when executed perform an operation as claimed in claim 14.

\* \* \* \* \*